(12) United States Patent
Campbell

(10) Patent No.: US 7,861,503 B1
(45) Date of Patent: Jan. 4, 2011

(54) ROTARY CUTTING DECK WITH HYDRAULIC DIRECT DRIVEN SPINDLE

(75) Inventor: Chad W. Campbell, Raleigh, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/696,191

(22) Filed: Jan. 29, 2010

(51) Int. Cl.
*A01D 34/00* (2006.01)
(52) U.S. Cl. ....................................... 56/17.5
(58) Field of Classification Search ................ 56/255, 56/295, 17.5; 464/32, 30, 42
See application file for complete search history.

(56) References Cited

U.S. PATENT DOCUMENTS

| | | | | |
|---|---|---|---|---|
| 3,430,461 A | * | 3/1969 | Boylan | 464/32 |
| 3,596,446 A | * | 8/1971 | Bryan | 464/39 |
| 3,788,050 A | * | 1/1974 | Houst et al. | 56/295 |
| 3,798,987 A | | 3/1974 | Hurd et al. | |
| 3,347,455 A | | 11/1974 | Vandermeulen et al. | |
| 3,894,383 A | | 7/1975 | Weis et al. | |
| 4,478,029 A | | 10/1984 | Moore et al. | |
| 5,033,595 A | * | 7/1991 | Pardee | 192/18 R |
| 5,117,617 A | | 6/1992 | Scag | |
| 5,502,958 A | * | 4/1996 | Plamper | 56/17.5 |
| 5,715,662 A | * | 2/1998 | Walters | 56/6 |
| 5,960,617 A | | 10/1999 | Sheldon | |
| 5,996,323 A | * | 12/1999 | Campbell et al. | 56/6 |
| 6,010,321 A | | 1/2000 | Forsythe et al. | |
| 6,205,755 B1 | * | 3/2001 | Bontrager et al. | 56/17.5 |
| 6,286,293 B1 | * | 9/2001 | Scag et al. | 56/17.5 |
| 6,352,243 B1 | * | 3/2002 | Samejima | 254/352 |
| 6,471,481 B2 | * | 10/2002 | Chen | 416/134 R |
| 6,524,069 B2 | * | 2/2003 | Chen | 416/134 R |
| 6,675,563 B1 | * | 1/2004 | Ehrhart et al. | 56/10.3 |
| 6,688,095 B2 | * | 2/2004 | Wadzinski | 56/255 |
| 6,718,745 B1 | * | 4/2004 | Adams | 56/6 |
| 6,729,117 B2 | | 5/2004 | Frazer | |
| 7,200,982 B2 | * | 4/2007 | Vandyke | 56/17.5 |
| 2002/0157363 A1 | * | 10/2002 | Kraus | 56/6 |
| 2003/0118443 A1 | * | 6/2003 | Chen | 416/2 |

* cited by examiner

*Primary Examiner*—Árpád Fábián-Kovács

(57) ABSTRACT

A rotary cutting deck with a hydraulic direct driven spindle includes a spindle housing attached to the rotary cutting deck and having a stepped internal bore, and a blade adapter inserted into the stepped internal bore and having a first, upper end connected to a hydraulic motor, and a second lower end with a contact surface against which a rotary cutting blade is clamped. A bolt threaded to the blade adapter provides the only clamping force between the rotary cutting blade and the contact surface, which is substantially flat and does not capture the blade. A notch or hole in the outer edge of the hydraulic direct driven spindle may be engaged to hold the hydraulic direct driven spindle stationary relative to the blade during installation or detachment of the blade.

10 Claims, 3 Drawing Sheets

ROTARY CUTTING DECK WITH HYDRAULIC DIRECT DRIVEN SPINDLE

FIELD OF THE INVENTION

The present invention relates to a rotary cutting deck with a cutting blade mounted to a hydraulic motor, and specifically to a rotary cutting deck with a hydraulic direct driven spindle.

BACKGROUND OF THE INVENTION

Many new and existing golf courses have narrowed their fairways and expanded their rough areas on either side of the fairways. Roughs require less care than fairways, so narrowing the fairways allows golf course operators to lower their maintenance costs. For example, irrigation requirements may be reduced if only the fairways are watered. If grasses in the roughs are allowed to grow longer, those non-irrigated areas are less brown. Trees and other aesthetic features may be located in the roughs, because roots and shade can inhibit turf growth in the fairways.

However, golf course roughs still must be maintained regularly using grass mowing machines that can mow the vegetation at an acceptable length and appearance. Equipment for mowing golf course roughs typically includes a traction vehicle carrying three or five rotary cutting decks, each rotary cutting deck mounted on the end of a lift arm extending from the traction vehicle. Each rotary cutting deck may have a hydraulic direct driven spindle that fastens a rotary cutting blade to a hydraulic motor. Conventional rotary cutting decks with hydraulic direct driven spindles capture a central part of the blade in a slot at the lower end of the spindle.

A first problem with conventional rotary cutting decks having hydraulic direct driven spindles occurs if the captured blade starts to become loose. If this occurs, the blade will continue to be driven by the hydraulic motor and will maintain momentum until it detaches completely. This presents a risk to operators and bystanders. A rotary cutting deck with a hydraulic direct driven spindle is needed that reduces the likelihood of driving the blade at high rotational speeds if it starts to become loose, and reduces the risk of blade detachment at high rotational speeds.

A second problem with conventional rotary cutting decks having hydraulic direct driven spindles occurs if the blade strikes a stationary object such as a large rock or stump. If this occurs, the blade, spindle or hydraulic motor may become damaged or fracture from direct axial loads. Unlike rotary cutting decks with belt drives that allow the spindle and blade to slip, decks with hydraulic direct driven spindles have captured blades that cannot slip. There is a need for a rotary cutting deck with a hydraulic direct driven spindle that can reduce the risk of damage or fracture of the blade, spindle or hydraulic motor if the blade strikes a stationary object.

SUMMARY OF THE INVENTION

A rotary cutting deck with a hydraulic direct driven spindle includes a blade adapter rotatably mounted in a spindle housing secured to the rotary cutting deck. The blade adapter has a first, upper end engaging a hydraulic motor and a second lower end having a flat surface area. A spacer nut engages the first, upper end of the blade adapter and holds an annular bearing housing between the blade adapter and spindle housing. A bolt is threaded to the second, lower end of the blade adapter and provides a slip joint between a rotary cutting blade and the flat surface area on the second, lower end of the blade adapter. A notch of hole in the blade adapter and housing can hold the hydraulic direct driven spindle in place during installation or removal of the blade.

The rotary cutting deck with a hydraulic direct driven spindle can reduce the likelihood of driving the blade at high rotational speeds if it starts to become loose, and reduce the risk of blade detachment at high rotational speeds. The invention allows the blade to slip if it strikes a stationary object, significantly reducing the risk of damage to the blade, spindle or hydraulic motor, and reducing the possibility of one or more components failing.

DESCRIPTION OF THE PREFERRED EMBODIMENT

Figure 1:
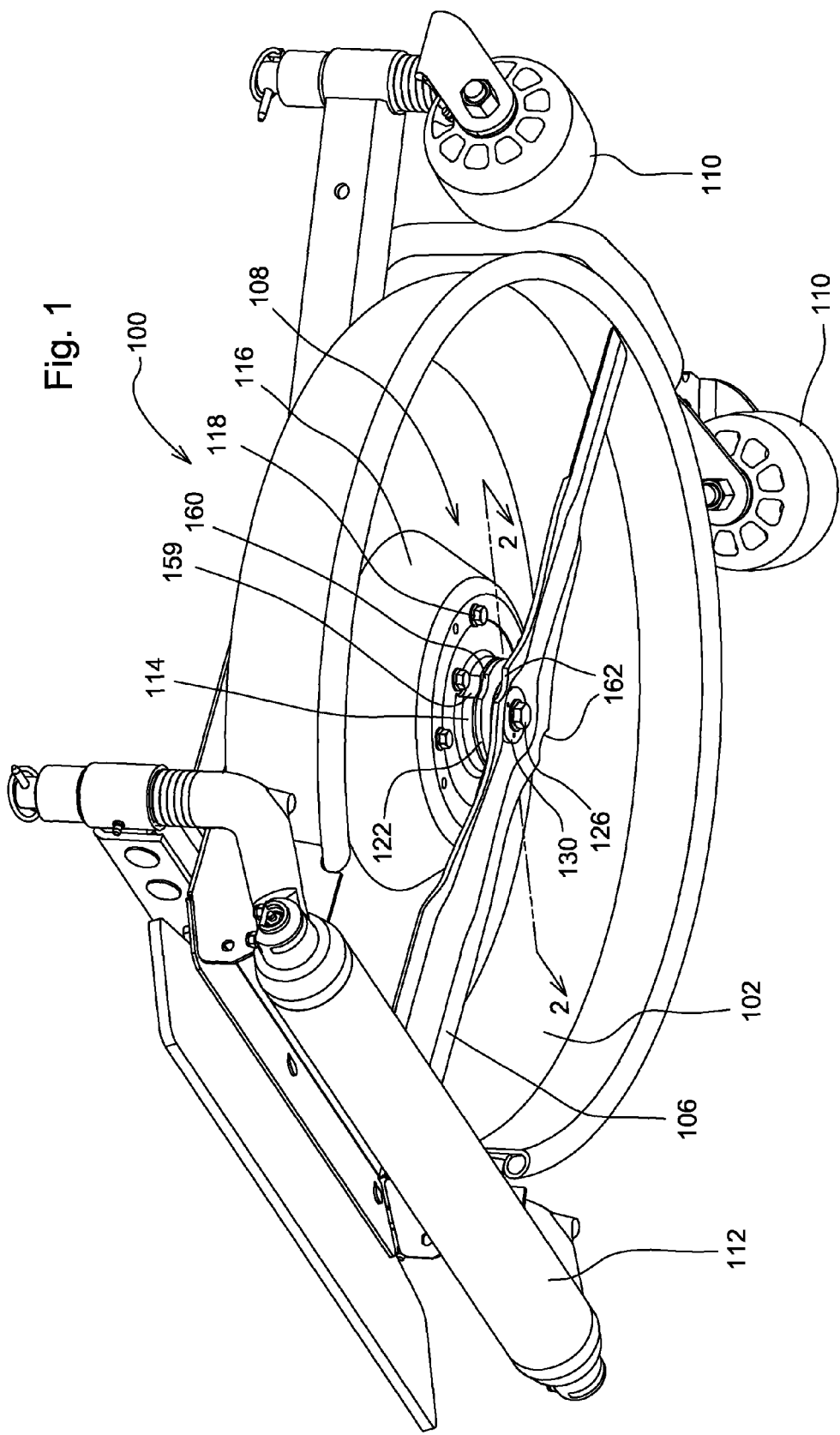
FIG. 1 is a perspective view of a rotary cutting deck with a hydraulic direct driven spindle according to a first embodiment of the invention.
Figure 2:
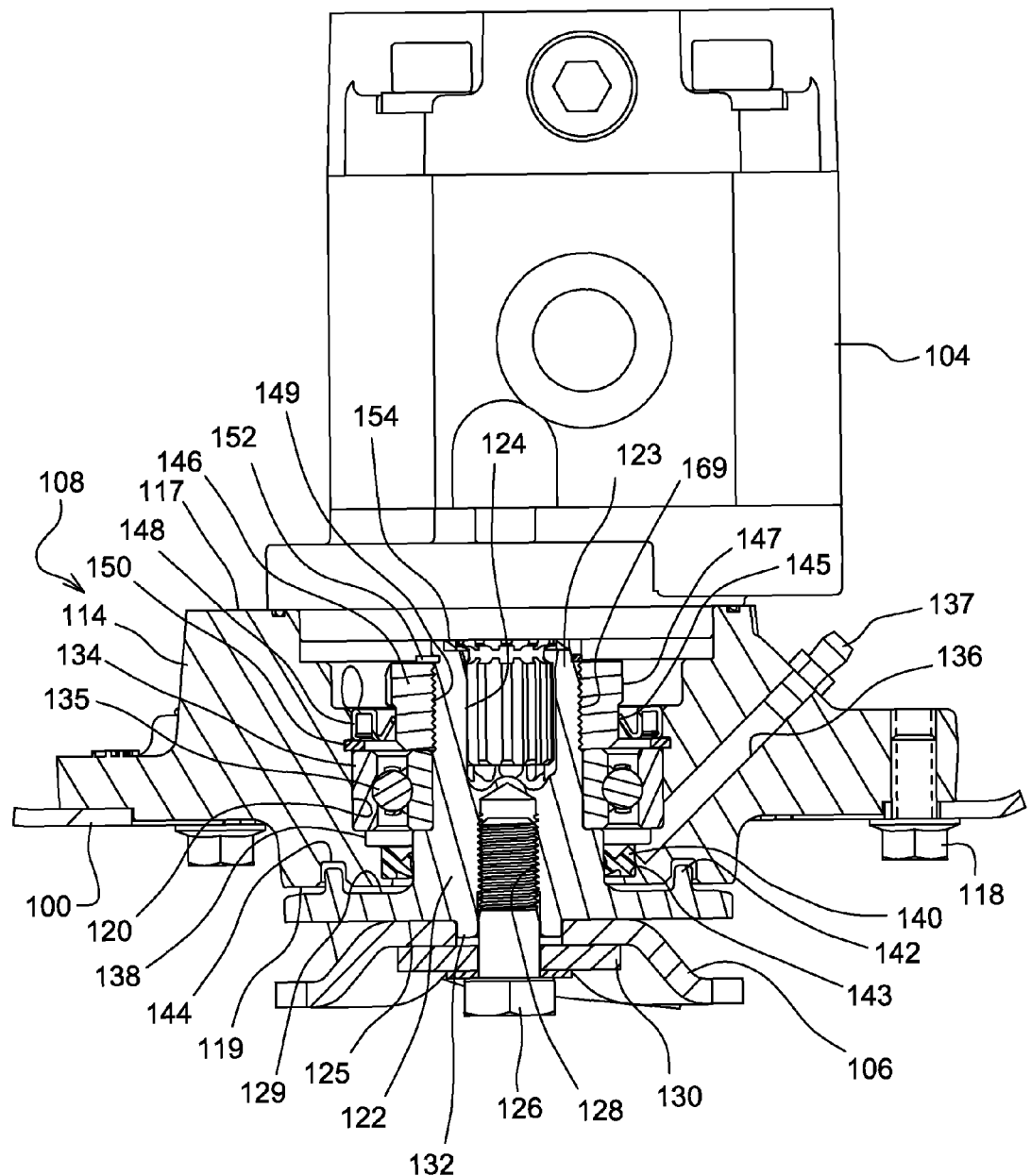
FIG. 2 is a cross section view of a hydraulic direct driven spindle according to a first embodiment of the invention.
Figure 3:
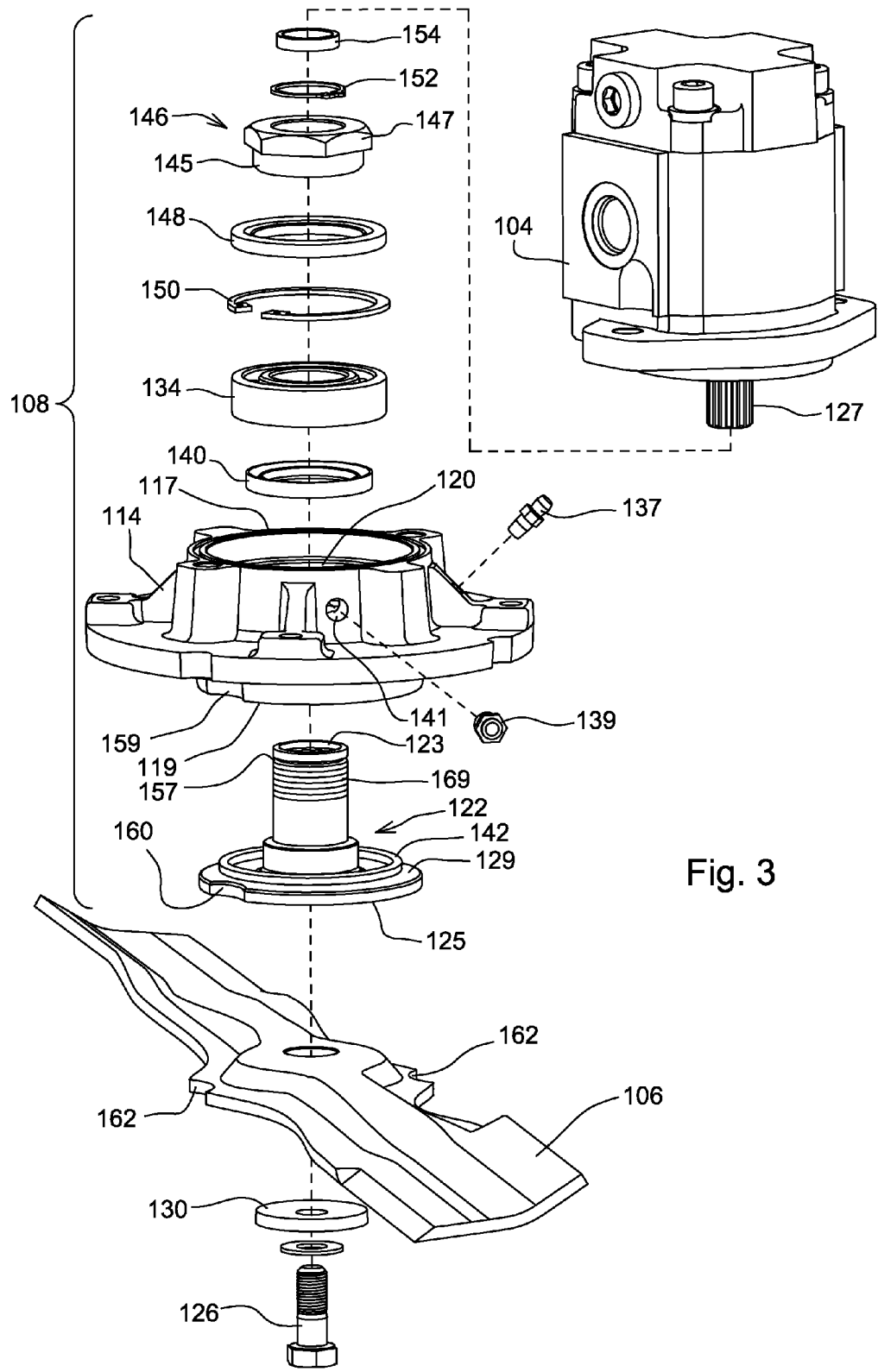
FIG. 3 is an exploded perspective view of a hydraulic direct driven spindle according to a first embodiment of the invention.

As shown in FIGS. 1-3, in a first embodiment, rotary cutting deck 100 may be carried by a traction vehicle. Typically, three or more rotary cutting decks are carried by the same traction vehicle. Each rotary cutting deck may include a circular inverted dish-shaped cutting chamber 102. Hydraulic motor 104 may be mounted to the upper top surface of the rotary cutting deck, and the motor may be connected by hydraulic conduits to a hydraulic pump. The hydraulic motor rotates cutting blade 106 that is removably mounted to the lower end of hydraulic direct driven spindle 108 under the deck. The rotary cutting deck may be supported to move over the ground surface by a front pair of rollers 110, casters or wheels, and a rear roller 112.

In one embodiment, hydraulic direct driven spindle 108 may include spindle housing 114 mounted to the rotary cutting deck, blade adapter 122 that rotates within the housing and connects rotary cutting blade 106 to hydraulic motor 104, annular bearing housing 134 between the blade adapter and housing, annular ring shaped seals 140 and 148 above and below the annular bearing housing, and spacer nut 146 to help secure the assembly together. The hydraulic direct driven spindle allows the blade to slip when impacted so that energy can dissipate, and significantly reduces the risk of breaking the blade, spindle assembly or hydraulic motor. The blade adapter does not capture the blade, so that if an incident occurs in which the blade bolt or connection fails, the blade will slip instead of continuing to be driven at a high rotational speed by the hydraulic motor.

In one embodiment, spindle housing 114 may be an aluminum casting mounted in a central recess 116 in the deck, and secured to the deck with bolts 118. The spindle housing may have a stepped internal bore 120 extending therethrough that generally decreases in circumference and diameter progressively in a plurality of steps from the first, upper end 117 to the second, lower end 119.

In one embodiment, blade adapter 122 may be an investment casting inserted into and extending through the stepped internal bore 120 of spindle housing 114. Hydraulic motor 104 may be secured to first, upper end 123 of the blade adapter, and rotary cutting blade 106 may be secured to downwardly facing second, lower end 125 of the blade adapter. The blade adapter may have a stepped outer body that generally increases in circumference and diameter progressively in a plurality of steps from first, upper end 123 to second, lower end 125. The second, lower end of the blade adapter may have a substantially larger circumference and diameter than the first, upper end, and preferably the second, lower end may be at least about 2× greater in circumference and diameter than the first, upper end.

In one embodiment, the first, upper end 123 of blade adapter 122 may have an internal splined connection to the hydraulic motor, with internal splines 124 that engage external splines 127 on the hydraulic motor drive shaft. Alternatively, the blade adapter may have a key and keyway connection to the hydraulic motor drive shaft. Motor pilot sleeve 154 may be positioned by a press fit onto the first, upper end of the blade adapter to help guide the motor splines into the blade adapter splines, or the key into the keyway, if the bearing does not provide sufficient support. Internally threaded bore 128 may extend into the second, lower end 125 of the blade adapter for engaging bolt 126 which is used to provide a slip joint for rotary cutting blade. Washers 130, 131 may be provided between the head of the bolt and the blade.

In one embodiment, the second, lower end 125 of blade adapter 122 provides a generally flat contact surface for the mower blade. That surface may provide a contact area of at least about 3 square inches and a diameter of at least about 2 inches. Bolt 126 may extend through washer and is threaded to the blade adapter to provide a slip joint between the rotary cutting blade and the flat contact surface on the second, lower end of the blade adapter. Bolt 126 may be an M12 bolt that can provide sufficient clamping load on the blade to secure the blade against the contact surface of the blade adapter. The contact surface on the second, lower end 125 of blade adapter 122 is substantially flat and does not include any slot or other capture feature to prevent the blade from rotating relative to the blade adapter. However, the second, lower end of the blade adapter includes blade positioning ring 132 around bore 128 which does not restrict rotation of the blade relative to the blade adapter. Blade positioning ring 132 may extend downwardly from the contact surface and may be dimensioned to receive and position a mounting hole centrally located in a rotary cutting blade. The ring may have an axial thickness less than the blade thickness, so a gap may be provided between the ring and washer 130 when the blade is mounted.

In one embodiment, the hydraulic direct driven spindle provides a slip joint that allows the blade to be self tightening in the event of a loose bolt, avoiding vibrations that would cause further loosening if the blade was captured. Opposing forces cause the tip of blade 106 to spin clockwise, and the friction between bolt 126 and blade 106 causes the bolt to also spin clockwise in the same direction as the blade. The bolt becomes tighter in the self tightening slip joint.

In one embodiment, the lower end of blade adapter 122 may have an upwardly facing surface 129 with debris protection ring 142 near the outer circumference. Debris protection ring 142 may extend upwardly from surface 129 and may have a radial thickness and height slightly less than the radial thickness of debris protection groove 144 in the lower surface 119 of spindle housing 114. The blade adapter can rotate freely while the debris protection ring extends into and rides in the groove to protect against ingress of debris.

In one embodiment, annular bearing housing 134 may be provided between blade adapter 122 and stepped internal bore 120. The annular bearing housing may hold a plurality of ball or roller bearings 135 which may be lubricated with grease or other lubricant via lubrication channel 136. Lubrication fitting 137 may be inserted into the outer end of the lubrication channel. The annular bearing housing's inner circumference may be positioned on a step on the blade adapter, and the annular bearing housing's outer circumference may be positioned on a step in the stepped internal bore of the spindle housing.

In one embodiment, a pair of ring-shaped annular seals 140 and 148 may be positioned around blade adapter 122 above and below annular bearing housing 134. For example, elastomeric rod wiper seal 140 may be a double lip seal positioned below the annular bearing housing, and metal seal 148 may be press fit into a seated position above the annular bearing housing. The pair of ring-shaped annular seals help contain grease or other lubricant needed for the ball or roller bearings in the annular bearing housing, and may prevent intrusion of debris or contaminants. Pressure relief channel 141 may be provided between stepped internal bore 120 and the outer surface of spindle housing 114, and may be capped by pressure relief fitting 139.

In one embodiment, pocket 138 may provide a gap between the annular bearing housing and elastomeric rod wiper seal 140, for grease or excess material. The elastomeric rod wiper seal may be positioned on step 143 at or adjacent the lower surface of spindle housing 114. The elastomeric rod wiper seal may provide a radial fluid seal between internal bore 120 of spindle housing 114 and the outer circumference of blade adapter 122.

In one embodiment, snap ring retainer 150 may be positioned in a groove in stepped internal bore 120 between annular bearing housing 134 and metal seal 148. The metal seal may be press fit in the stepped internal bore and seated on the snap ring retainer. The metal seal may provide a radial fluid seal between the stepped internal bore of spindle housing 114 and the cylindrical outer surface 145 of spacer nut 146. Spacer nut 146 may have internal threads 149 that may engage external threads 169 around and adjacent the first, upper end of blade adapter 122. Threads 149 may extend axially sufficiently down from the upper end of the blade adapter so that the fully engaged spacer nut can abut bearing housing 134. The spacer nut also may have a hexagonal portion 147 that may be gripped for tightening the spacer nut onto the blade adapter. Snap ring retainer 152 may be positioned in groove 157 adjacent the upper end 123 of the blade adapter above the spacer nut.

In one embodiment, one or more notches 159 or holes may be provided in the outer edge or circumference of the lower end 119 of spindle housing 114, and one or more similar notches 160 or holes may be provided in the outer edge or circumference of the second, lower end 125 of blade adapter 122. Similarly, one or more notches 162 or holes may be provided on the edge or edges of cutting blade 106. The notches or holes on the blade may be aligned with those on the spindle housing and blade adapter. As a result, the hydraulic direct driven spindle may be held stationary while the blade is being attached or detached. A tool may be used to engage the notches or holes of the spindle housing and blade adapter to hold the components stationary. Thus, each rotating component of the hydraulic direct driven spindle may be locked in a stationary position, and blocked from rotation, by a tool inserted into the notch or hole of the non-rotating component. As used herein, the term "notch" means any feature, including but not limited to a hole, slot or groove, that may be mutually aligned and held using a tool to block relative rotation during removal or installation of the cutting blade, but which does not block relative rotation of the blade adapter, spindle housing or blade when the tool is not used. For example, a tool such as a rod may be inserted through aligned holes in each of the components, to hold the components stationary, while removing or installing a cutting blade.

Having described the preferred embodiment, it will become apparent that various modifications can be made without departing from the scope of the invention as defined in the accompanying claims.

The invention claimed is:

1. A rotary cutting deck with a hydraulic direct driven spindle, comprising:
   a spindle housing attached to the rotary cutting deck and having a stepped internal bore;
   a blade adapter inserted into the stepped internal bore and having a first, upper end and a second lower end with a flat end face;
   a hydraulic motor connected to the first, upper end of the blade adapter and a rotary cutting blade having a center clamped to the flat end face; and
   a notch in the outer edge of the hydraulic direct driven spindle that holds the hydraulic direct driven spindle stationary relative to the blade during installation or detachment of the blade.

2. The rotary cutting deck with a hydraulic direct driven spindle of claim 1 further comprising a bolt threaded to the blade adapter providing the only clamping force between the rotary cutting blade and the flat end face.

3. The rotary cutting deck with a hydraulic direct driven spindle of claim 1 wherein the flat end face does not capture the rotary cutting blade relative to the blade adapter.

4. The rotary cutting deck with a hydraulic direct driven spindle of claim 1 further comprising a spacer nut threaded around the first, upper end of the blade adapter and abutting an annular bearing housing positioned between the stepped internal bore of the spindle housing and the blade adapter.

5. A rotary cutting deck with a hydraulic direct driven spindle, comprising:
   a blade adapter rotatably mounted in a spindle housing secured to the rotary cutting deck; the blade adapter having a first, upper end engaging a hydraulic motor and a second lower end having a flat end face;
   a spacer nut engaging the first, upper end of the blade adapter and holding an annular bearing housing between the blade adapter and spindle housing;
   a bolt threaded to the second, lower end of the blade adapter and providing a slip joint between the center of a rotary cutting blade and the flat end face on the second, lower end of the blade adapter; and
   a notch in the blade adapter holding the hydraulic direct driven spindle in place during installation or removal of the blade.

6. The rotary cutting deck with a hydraulic direct driven spindle of claim 5 further comprising a slot in the spindle housing that may be aligned with the slot in the blade adapter during installation or removal of the blade.

7. The rotary cutting deck with a hydraulic direct driven spindle of claim 5 further comprising an annular metal seal above the annular bearing housing and forming a seal between the spindle housing and the spacer nut, and an annular elastomeric seal below the annular bearing housing and forming a seal between the spindle housing and the blade adapter.

8. A rotary cutting deck with a hydraulic direct driven spindle, comprising:
   a spindle housing having a stepped internal bore that progressively increases in diameter from a first, upper end to a second, lower end;
   a hydraulic motor mounted to the first, upper end of the spindle housing;
   a blade adapter inserted into and rotatably mounted in the stepped internal bore and having a first, upper end connected to the hydraulic motor and a second, flat lower end face connected to the rotary cutting blade with a bolt through a hole midway between a first end and a second end of the rotary cutting blade.

9. The rotary cutting deck with a hydraulic direct driven spindle of claim 8 further comprising notches in the second, lower ends of the spindle housing and blade adapter, the notches holding engageable to hold the spindle housing and blade adapter stationary during loosening or tightening of the bolt clamping the blade to the flat lower end face.

10. The rotary cutting deck with a hydraulic direct driven spindle of claim 8 further comprising a bearing housing positioned between the spindle housing and blade adapter, and annular seals above and below the bearing housing.

* * * * *